June 1, 1943.   W. H. TAIT ET AL   2,320,761
APPARATUS FOR ELECTRICALLY TESTING THE THICKNESS OF THIN LAYERS
Filed Oct. 22, 1940   2 Sheets-Sheet 1

Inventors
W. H. Tait &
B. Chalmers

By Glascock Downing & Seebold
Attys.

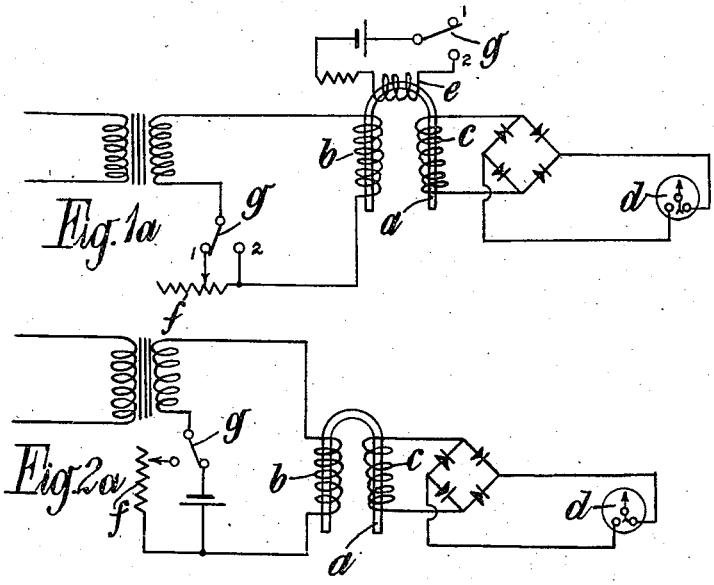
Fig.1a
Fig.2a
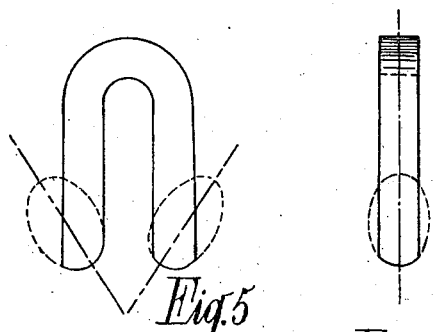
Fig.5
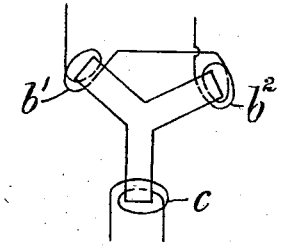
Fig.6   Fig.7
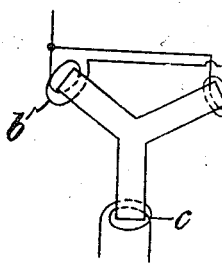
Fig.8
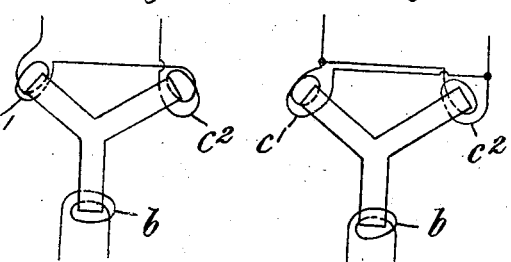
Fig.9   Fig.10
Inventors
W. H. Tait &
B. Chalmers
By Glascock Downing & Seebold
Attys.

Patented June 1, 1943

2,320,761

UNITED STATES PATENT OFFICE 2,320,761

APPARATUS FOR ELECTRICALLY TESTING THE THICKNESS OF THIN LAYERS

William Henry Tait, Pinner, and Bruce Chalmers, London, England

Application October 22, 1940, Serial No. 362,290
In Great Britain October 26, 1939

8 Claims. (Cl. 175—183)

This invention relates to electro-magnetic apparatus for measuring the thickness of thin layers, of the kind in which such thickness is measured by measuring changes in a magnetic circuit formed by a transformer core and a magnetic base on which is supported the layer whose thickness is to be measured and which thus forms a "gap" in the magnetic circuit. The property of the magnetic circuit that depends upon the thickness of the layer may be the self-inductance or the impedance of a coil surrounding part of the magnetic circuit or it may be the mutual inductance of two such coils. Measurements made with such apparatus are accurate only for layers on basis metals which have the same magnetic properties and whose shape and size lie within certain limits. Various methods have been proposed to allow corrections to be made for variations in the magnetic properties and dimensions and profile of the magnetic base, but all such methods are dependent on the assumption that the magnetic base is flat and uniform over its surface and that its properties are non-directional.

We have found, however, that these conditions are not always satisfied, and an object of the present invention is to devise simple and practical apparatus by which accurate correction can be made for wide variations in the dimensions and magnetic properties of the magnetic base and by which the effect of curvature of the base can be minimised.

The invention includes means for compensating for variations in the magnetic properties and dimensions of the magnetic base which consists in magnetising to saturation, for part or all of the cycle, a part or the whole of the transformer core, and the invention is founded upon the observation that when such a condition is fulfilled the influence of the thickness of the "gap" decreases in comparison with that of the magnetic properties of the base. An instrument in accordance with the invention can therefore be made to measure to within narrow limits the magnetic properties of the base, this measurement being uninfluenced by variations in the thickness of layer.

The invention also consists in apparatus of the kind referred to in which each pole-piece of the transformer core is shaped approximately to the form of a part of an ellipsoid of which the major axis may be inclined to the vertical.

Further features of the invention will be apparent from the description given hereafter.

The accompanying drawings illustrate several modes of carrying out the invention.

Figures 1, 1a, 2, 2a, 3 and 4 are diagrams illustrating six convenient circuit arrangements in accordance with the invention.

Figures 5 and 6 are respectively a front view and side view of one convenient form of transformer core, and Figures 7 to 10 show four methods of using a three-limbed transformer core.

Figure 1:
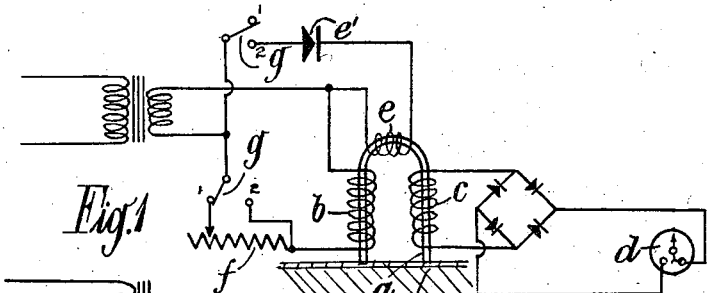
Figure 2:
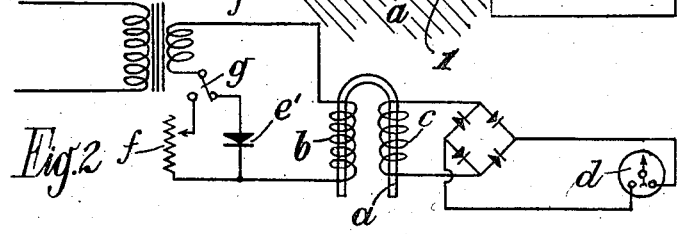

In carrying our invention into effect in one convenient manner as, for example, in its application to the measurement of the thickness of tin coating $i$ on tin-plate, and as illustrated in Figure 1, we form our apparatus with a U-shaped core $a$ of magnetic material such as iron, upon one limb of which is a primary coil $b$ to which a standard alternating current is applied, while the other limb carries a secondary coil $c$ connected to a galvanometer $d$ or other suitable current measuring device. We arrange to saturate a part of the core by passing direct current as from a battery in Fig. 1a or rectifier, as in Fig. 1 through an additional coil $e$ encircling part of the core (for example that part midway between the input and output coils) or alternatively, as shown in Fig. 2 we may use the current passed by a half wave rectifier for both saturating current and primary current simultaneously. Or, alternatively as in Figure 2a we may superimpose a direct current, such as from an accumulator upon the alternating current through the primary coil. We may obtain the rectified current by the use of a rectifier $e'$ which must be of ½ wave type in the circuits shown in Figures 2, 3 and 4, but in other cases may be of ½ or full wave type.

When a reading of the magnetic properties of the base material has been taken the rectified or direct current can be discontinued and the instrument used in the known manner to measure coating thickness, correction for magnetic properties being applied in any approved manner as by means of a rheostat $f$ with calibrated sliding contact in the circuit. We may embody a change-over switch $g$ which in one position will put the rectifier or source of direct current in the circuit and in a second position will cut out the rectifier or source of direct current and insert the rheostat in the circuit.

Figure 3:
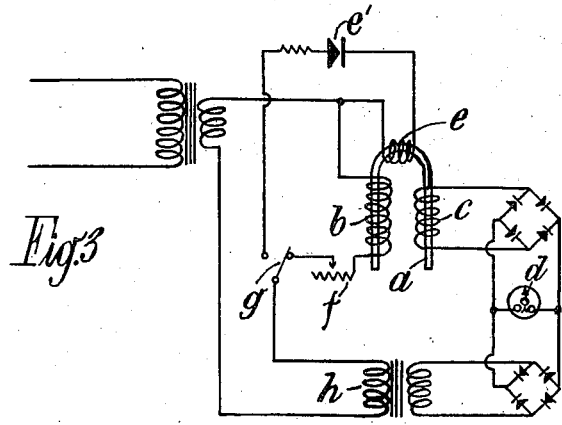
Figure 4:
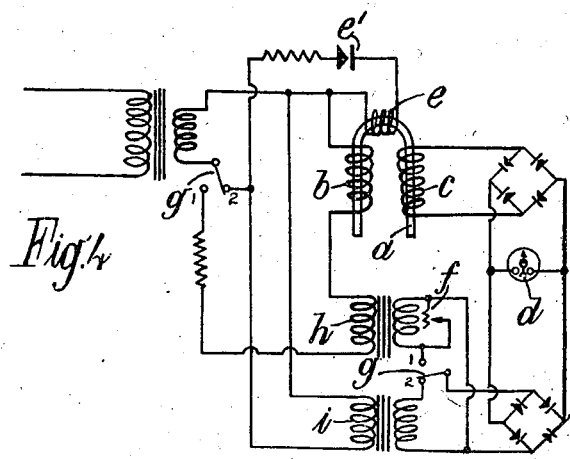

With the arrangements described the current changes in the secondary may vary over a wide range and if the indicating instrument has to cover the whole range the useful part might be confined to a small part of the instrument scale, allowing insufficient accuracy of reading. We therefore prefer to provide a current opposed to the secondary so as to suppress the true zero so that the indicating instrument only starts to read from its zero mark when a certain current is already flowing in the secondary output circuit of the measuring transformer. Figure 3 shows an arrangement of the circuit in which a single transformer $h$ providing the backing-off current serves for both the check and test readings. In Figure 4, we provide two transformers, $h$ for the test reading and $i$ for the check reading. This last arrangement is preferred for high sensitivity circuits.

A further advantage of the use of backing-off currents is that by suitable adjustment of windings and magnetic gaps it is possible to make the instrument, to a considerable extent, independent of fluctuations of voltage in the electric mains.

As an alternative to the U-shaped core we may use a core with three parallel limbs magnetically linked at one end, the primary coil encircling one limb and secondary coils, connected either in series or parallel, on the remaining two limbs. Alternatively, we may use two primary coils and one secondary. Figures 7 and 8 show such an arrangement with two primary coils $b'$ $b^2$ (in series in Figure 7 and in parallel in Figure 8) and one secondary coil $c$, while Figures 9 and 10 show two secondary coils $c'$ $c^2$ (in series in one case and in parallel in the other) and one primary coil $b$.

For the purpose of eliminating the effect of curvature of the magnetic base we prefer to form each of the pole-pieces of the core so that it approximates to part of an ellipsoid of which the major axis may be inclined to the vertical, as shown in Figures 5 and 6.

It will be understood that while we have described the invention in its application to the measurement of the thickness of the coating upon tin-plate, it may be applied with equal effect and like advantage to the measurement of the thickness of any thin layer or lamina which may be made to serve as a "gap" in the magnetic circuit associated with means for measuring changes in the magnetic circuit.

We claim:

1. Apparatus for determining the thickness of a relatively thin layer carried by a magnetizable base member comprising, a transformer including a primary winding and a secondary winding and a magnetizable core adapted to be bridged at ends thereof by said base member forming a magnetic circuit with said layer forming a gap in the magnetic circuit, means for supplying alternating current to said primary winding, means for measuring the voltage across the secondary winding, and means for magnetically saturating said core.

2. Apparatus for measuring the thickness of relatively thin layers each carried by a different magnetizable base member comprising, a transformer having a primary winding and a secondary winding and a magnetizable core adapted to be bridged at ends thereof by one of the base members so as to form a magnetic circuit with a layer to be measured forming a gap in the magnetic circuit, means for impressing alternating current across said primary winding, means for measuring the current flowing in the secondary winding, and means for magnetically saturating said core to compensate variations in the magnetic characteristics of the base members.

3. Apparatus for measuring the thickness of a relatively thin layer carried by a magnetizable base member comprising, a magnetizable core forming a part of a magnetic circuit which includes the base member with the layer to be measured in said magnetic circuit, a primary winding on said core, means for supplying alternating current to said primary winding, a secondary winding on said core, means for measuring the current flowing in said secondary winding, and means operable during a part of a cycle of the alternating current for magnetically saturating said core to compensate variations in the magnetic characteristics of said base member.

4. Apparatus for measuring the thickness of a relatively thin layer carried by a magnetizable base member comprising, a magnetizable core forming a part of a magnetic circuit which includes the base member with the layer to be measured in said magnetic circuit, a primary winding on said core, means for supplying alternating current to said primary winding, a secondary winding on said core, means for measuring the current flowing in said secondary winding, and means including a source of direct current for magnetically saturating said core.

5. Apparatus for measuring the thickness of a relatively thin layer carried by a magnetizable base member comprising, a magnetizable core forming a part of a magnetic circuit which includes the base member with the layer to be measured in said magnetic circuit, a primary winding on said core, means for supplying alternating current to said primary winding, a secondary winding on said core, means for measuring the current flowing in said secondary winding, a supplementary coil on said core, and means for energizing the supplementary coil to magnetically saturate said core.

6. Apparatus for measuring the thickness of a relatively thin layer carried by a magnetizable base member comprising, a magnetizable core forming a part of a magnetic circuit which includes the base member with the layer to be measured in said magnetic circuit, a primary winding on said core, means for supplying alternating current to said primary winding, a secondary winding on said core, means for measuring the current flowing in said secondary winding, a supplementary coil arranged on said core between the primary and secondary windings, and means for supplying direct current to said supplementary coil for magnetically saturating said core.

7. Apparatus for measuring the thickness of a relatively thin layer carried by a magnetizable base member comprising, a magnetizable core forming a part of a magnetic circuit which includes the base member with the layer to be measured in said magnetic circuit, a primary winding on said core, means for supplying alternating current to said primary winding, a secondary winding on said core, means for measuring the current flowing in said secondary winding, and means for impressing direct current across said primary winding.

8. Apparatus for measuring the thickness of a relatively thin layer supported on a magnetizable base member comprising, a U-shaped magnetizable core adapted to be bridged by the base member with the layer to be measured between the ends of the core and the base member, a primary winding on said core, means for supplying alternating current to said primary winding, a secondary winding on said core, means for measuring the current flowing in said secondary winding, means for magnetically saturating said core, and the ends of said core being shaped substantially in the form of an ellipsoid with the major axis of each inclined with respect to the axis of the legs of the core.

WILLIAM HENRY TAIT.
BRUCE CHALMERS.